(12) United States Patent
Yang et al.

(10) Patent No.: US 12,498,135 B2
(45) Date of Patent: Dec. 16, 2025

(54) SPRAY COOLING FAN CONTROL SYSTEM AND METHOD BASED ON THE COMPUTER VISION TECHNOLOGY

(71) Applicants: Zhejiang Hengxi Optoelectronics Technology Co., Ltd, Taizhou (CN); Tianjin Chengjian University, Tianjin (CN)

(72) Inventors: Bin Yang, Tianjin (CN); Yuyao Guo, Tianjin (CN); Fei Wang, Tianjin (CN); Ke Zhang, Tianjin (CN); Yawen Gai, Tianjin (CN); Jinxia Gao, Tianjin (CN); Ruiqi Guo, Tianjin (CN); Xiaojing Li, Tianjin (CN)

(73) Assignees: Zhejiang Hengxi Optoelectronics Technology Co., Ltd, Taizhou (CN); Tianjin Chengjian University, Tianjin (CN)

( * ) Notice: Subject to any disclaimer, the term of this patent is extended or adjusted under 35 U.S.C. 154(b) by 552 days.

(21) Appl. No.: 17/978,581

(22) Filed: Nov. 1, 2022

(65) Prior Publication Data
US 2023/0314032 A1  Oct. 5, 2023

(30) Foreign Application Priority Data
Mar. 31, 2022  (CN) .......................... 202210335455.3

(51) Int. Cl.
*F24F 11/63* (2018.01)
*F24F 5/00* (2006.01)
(Continued)

(52) U.S. Cl.
CPC ............ *F24F 11/63* (2018.01); *F24F 5/0035* (2013.01); *G05D 1/0094* (2013.01);
(Continued)

(58) Field of Classification Search
CPC ...... F24F 11/63; F24F 5/0035; F24F 2110/12; F24F 2110/22; F24F 2120/10;
(Continued)

(56) References Cited

U.S. PATENT DOCUMENTS

2020/0355379 A1* 11/2020 Kim ...................... F28F 13/125

FOREIGN PATENT DOCUMENTS

CN            110057009 A  *  7/2019  .............. F24F 11/64

* cited by examiner

Primary Examiner — Aniss Chad
Assistant Examiner — Chase L Cooley
(74) Attorney, Agent, or Firm — Zhigang Ma

(57) ABSTRACT

The invention discloses a spray cooling fan control system and method based on computer vision technology. The data acquisition system monitors person thermal comfort through various non-contact measurement methods, which improves the accuracy and instantaneity and achieves human thermal comfort and energy saving. The information processing system adjusts the air and spray volume based on human skin temperature and thermal sensation and plans the mobile path. The mobile control system moves the spray cooling fan to the optimal location so that the mobility and flexibility are enhanced. The intelligent voice interaction system and the end control system control the opening of the fan intelligently and humanely so that people become the main subject which controls the environmental temperature optimization equipment. Consequently, the invention cools person precisely and meets the thermal environment control and personnel thermal needs quickly.

9 Claims, 4 Drawing Sheets

(51) Int. Cl.
*F24F 110/12* (2018.01)
*F24F 110/22* (2018.01)
*F24F 120/10* (2018.01)
*G01J 5/00* (2022.01)
*G05D 1/00* (2024.01)

(52) U.S. Cl.
CPC ........ *G05D 1/0242* (2013.01); *F24F 2110/12* (2018.01); *F24F 2110/22* (2018.01); *F24F 2120/10* (2018.01); *F24F 2221/125* (2013.01); *F24F 2221/42* (2013.01); *G01J 2005/0077* (2013.01)

(58) Field of Classification Search
CPC ............. F24F 2221/125; F24F 2221/42; F24F 2006/008; F24F 2110/10; F24F 2110/20; F24F 2120/12; F24F 11/0008; F24F 11/526; F24F 11/54; F24F 11/64; F24F 6/12; F24F 11/80; F24F 2120/20; G05D 1/0094; G05D 1/0242; G01J 2005/0077; G01J 5/0025

See application file for complete search history.

SPRAY COOLING FAN CONTROL SYSTEM AND METHOD BASED ON THE COMPUTER VISION TECHNOLOGY

FIELD OF THE DISCLOSURE

The present invention belongs to the field of spray cooling fan technology, which specifically belongs to a spray cooling fan control system and method based on computer vision technology.

BACKGROUND OF THE DISCLOSURE

A cool, green summer outdoor thermal environment can meet the comfort of people for leisure, exercise and play. During the hot summer, people prefer to stay in air-conditioned rooms for long periods rather than "going outside" because of the long-term problem of high outdoor thermal environment temperatures in most areas. This not only increases the risk of sick building syndrome, which is detrimental to the long-term development of physical and mental health, but also greatly increases the energy consumption and carbon emissions of building operations.

The shade, spray cooling fan and spray cooling device are widely used in the outdoor thermal environment with high energy consumption, which does not make the outdoor thermal environment reach the required level of thermal comfort for outdoor personnel rest or activities. The shade can only block the sun but affect the harmony of the landscape. Although the shade allows the UV radiation to human body to be greatly reduced, its cooling effect is not obvious in the high temperature situation. Common spray cooling fan makes people and the surrounding hot outdoor air for forced convection heat exchange. But in the summer when the average outdoor temperature is as high as 40° C., the human body cooling effect by blowing spray cooling fan will be greatly reduced. The spray cooling fan is located in a fixed position with a single function, thus its effect is not good when people are at a relatively far distance from the spray cooling fan.

Although the existing spray cooling fan and spray cooling pipe network using the spray for cooling improve the thermal environment, this outdoor thermal environment cooling method still has a time lag and deviation in temperature and humidity due to their position being relatively fixed and they cannot cool the thermal environment timely, accurately and precisely according to the number of people in the environment and their discomfort status. Secondly, the spray cooling devices are often regulated by the state of temperature and humidity parameters in a certain area as well as the experience of professionals, which not only fails to meet the actual thermal needs of people with different thermal preferences but also is not beneficial to energy conservation.

The current outdoor thermal environment sprays cooling fans and spray cooling pipe networks are widely used, but there are still many limitations in their control systems as shown below.

1. The number of people in each public activity area varies from time to time each day, and the tracks of outdoor people are variable. The existing spray pipe network cannot control the opening and closing of the spray pipe network in the area according to the activities of the people in the cooling area and adjust the size of the spray volume as required according to the number of people and activities, which causes both a poor thermal environment and a waste of water and electricity. The spray network only contains spray cooling and is not combined with a fan, which is less effective than spray cooling fans.

2. The existing spray cooling fan has a larger cooling range and stronger convective heat transfer than the spray pipe network, but it is unable to obtain the thermal comfort of outdoor people in real-time. Consequently, the personnel is in a passive state and the temperature and humidity of the spray cooling system are not controlled by the personnel in the environment but by professional or non-professional managers based on experience and the temperature and humidity measured by a temperature and humidity meter at a fixed place in the area. The spray cooling system cannot be accurately, effectively and quickly fed back and controlled.

3. The spray cooling fans and the spray pipe network have the disadvantage of being in fixed positions so that they cannot be moved according to the number and distribution of personnel, lacking in intelligence and humanization, thus causing unnecessary consumption of resources.

SUMMARY OF THE INVENTION

In order to solve the problems existing in the prior technology and inventions, the present invention provides a spray cooling fan control system and method based on computer vision technology, which solves the problem that the prior technology and inventions cannot meet the thermal comfort of outdoor personnel in summer.

To achieve the above purpose, the present invention provides the following technical solution: a spray cooling fan control system based on computer vision technology, comprising a data acquisition system, an information processing system, a mobile control system, an intelligent voice interaction system and an terminal control system, wherein, The data acquisition system is used to collect the posture and positions of people in the control area, facial skin temperature, the initial position of the spray cooling fan, outdoor air temperature and humidity and ground temperature, and compare the outdoor air temperature with the outdoor air temperature threshold. When the outdoor air temperature is greater than the outdoor air temperature threshold, the above data information is transmitted to the information processing system.

The information processing system is used to obtain the data information collected by the data acquisition system, and optimize the data information to calculate the group thermal sensation, the optimal position of the spray cooling fan and the real-time obstacle avoidance information of the spray cooling fan movement. When the group thermal sensation is greater than the group thermal sensation threshold, the information processing system obtains the optimal route of the spray cooling fan movement according to the initial position of the spray cooling fan, the optimal position of the spray cooling fan and the real-time obstacle avoidance information of the spray cooling fan movement. Subsequently, the optimal route for the movement of the spray cooling fan is transferred to the mobile control system and the group thermal sensations are transferred to the terminal control system.

The mobile control system is used to control the spray cooling fan to move to the optimal position according to the optimal route of the spray cooling fan movement and the real-time obstacle avoidance information of the spray cooling fan movement. The location information of the mobile control system will be transmitted to the intelligent voice interaction system.

The intelligent voice interaction system is used to acquire information on the location of the spray cooling fan and interrogate person around the spray cooling fan to turn on the spray and/or the fan. Then the voice commands of person are transmitted to the terminal control system.

The terminal control system is used to obtain voice commands of person, and control the opening of the spray cooling fan according to the group thermal sensation.

Further, the data acquisition system comprises a personnel data acquisition module, an environmental data acquisition module and a position module, wherein, The personnel data acquisition module comprises a camera and an infrared temperature sensor set on top of the spray cooling fan. The camera is used to acquire a digital image matrix of personnel posture, personnel position, personnel density and facial skin temperature of persons. The infrared temperature sensor is used to calculate the facial skin temperature of persons with the camera.

The environmental data acquisition module includes an air temperature sensor, an air humidity sensor and an infrared temperature sensor under the solar photovoltaic power panel on top of the spray cooling fan. The air temperature sensor is used to gather air temperature near the spray cooling fan in the control area. The air humidity sensor is used to collect air humidity near the spray cooling fan in the control area. The infrared temperature sensor is used to acquire ground temperature near the spray cooling fan in the control area.

The position module includes a spray cooling fan locator and an ultrasonic distance meter. The spray cooling fan locator is used to collect the spray cooling fan position with GPS. The ultrasonic distance meter is used to obtain the distance between the personnel and the spray cooling fan. Subsequently, the distance and personnel position are combined with the personnel density to get the position on the map.

Further, the information processing system comprises an optimization detection module, an optimal route selection module, and an ultrasonic obstacle avoidance module, specifically.

The optimization detection module is used to modify the mathematical model between the facial skin temperature of the person, the outdoor air temperature and humidity in the control area, the ground temperature and the thermal sensation of the personnel. Then the thermal sensation of each person is calculated, which is integrated into the group thermal sensation by a fuzzy integrated evaluation method. When the group thermal sensation is greater than the group thermal sensation threshold, the group thermal sensation is transmitted to the ultrasonic obstacle avoidance module, the optimal route selection module and the terminal control system.

The ultrasonic obstacle avoidance module is used to transmit and receive ultrasonic, and acquired distance between the spray cooling fan, the person, and the obstacle. Thus, real-time obstacle avoidance information of the spray cooling fan movement and the position coordinates of the personnel in the control area is obtained. The area with the largest number of persons in the positioning coordinates is set as the target area. The location which is 0.5 m around the target area and the closest to the spray cooling fan is the optimal position for the spray cooling fan. Then the real-time obstacle avoidance information of the spray cooling fan movement and the optimal position of the spray cooling fan are sent to the optimal route selection module.

The optimal route selection module is used to calculate the real-time obstacle avoidance information of the spray cooling fan movement and the optimal position of the spray cooling fan. The optimal route from the initial positioning of the spray cooling fan to the optimal position of the spray cooling fan is acquired through an ant colony algorithm. The optimal route information is transmitted to the mobile control system.

Further, the terminal control system receives the voice command of the person from the intelligent voice interaction system to turn on the fan and/or the spray device. According to the group thermal sensation is obtained by the optimization detection module, the terminal control system adjusts the fan and/or the spray opening by the fan gear and the spray water flow valve opening corresponding.

The terminal control system receives a voice command from the person to turn off the spray cooling fan or spray device obtained by the intelligent voice interaction system. When the group thermal sensation is less than the group thermal sensation threshold, the terminal control system is used to control the fan and/or spray device to turn off.

Further, the biological real-time machine learning system are used to store the facial skin temperature of person, outdoor air temperature, outdoor air humidity, outdoor ground temperature, group thermal sensation, person position, optimal route moving the spray cooling fan and fan gear and/or spray water volume information after regulating. Then the person's activity area based on the above data preferences and group thermal preferences are obtained.

Further, an alarm system is used to alarm and warn the water level of the water tank of the spray cooling fan and the remaining battery power. When the water level is less than 30% and/or the remaining battery power is less than 20%, the alarm system alarms. Then the information processing system obtains the alarm information. According to the position of the spray cooling fan, the optimal route of the spray cooling fan from this location to the water storage room is calculated through ant colony algorithm. Then it is transmitted to the mobile control system, which drives the spray cooling fan to move to the water storage room.

Further, the spray cooling fan includes a ground cooling system, which is used to cool the outdoor ground within the control area. 1) when the person's command directly obtained from the intelligent voice interaction system is turning on the fan and/or spray, the ground cooling system is not turned on.

2) When the outdoor air temperature is not greater than the outdoor air temperature threshold, or the personnel thermal posture is not captured, or the group thermal sensation is not greater than the group thermal sensation threshold, or the terminal control system is acquired the personnel voice command of the fan and/or sprays not need to turn on, the data acquisition system is acquired the outdoor ground temperature. When the outdoor ground temperature is greater than the outdoor ground temperature threshold, the data acquisition system divides the control area map into 1*1 m2 small squares. Not only the temperature at the center of each small square, but also all small squares where the outdoor ground temperature exceeds the outdoor ground temperature threshold are obtained.

The information processing system is used to calculate the position of the spray cooling fan at the moment. The optimal route from the position of the spray cooling fan to the center point of the small square needed to cool is acquired through ant colony algorithm.

The mobile control system controls the movement of the spray cooling fan according to the optimal route of the spray cooling fan movement. Meanwhile, the ground cooling system turns on the ground spray for cooling the ground.

When the spray cooling fan reaches the final position, the mobile control system controls the spray cooling fan to stop moving. The ground cooling system controls the ground spray to turn off. When the outdoor ground temperature is less than the outdoor ground temperature threshold, the ground cooling system is not turned on.

Further, the group thermal sensation $TSV_q$ is calculated by the formula:

$$TSV_q = a_1 TSV_1 + a_2 TSV_2 + \ldots + a_m TSV_m$$

The $TSV_q$ is the group thermal sensation in the control area, which is a linear function of the real-time thermal sensation of each person. $a_m$ is the m-th personal thermal sensation weigh factor, which represents the degree of influence of the m-th personal thermal sensation on the group thermal sensation, and $$\sum_1^m a_m = 1.$$

The weight of all persons in the area is set to be equal for regulating the summer outdoor thermal environment area, and $$a_1 = a_2 = \ldots = a_m = \frac{1}{m}.$$

If the thermal sensation of a person in the control area exceeds the upper threshold, the weight factor of this person is appropriately increased to meet the thermal comfort of this person. $TSV_m$ is the real-time thermal sensation of the m-th person.

The correspondence between the group thermal sensation value:

| Thermal Description | Hot | Warm | Slightly warm | Normal | Slightly cool | Cool | Cold |
|---|---|---|---|---|---|---|---|
| TSVn numerical values | 3 | 2 | 1 | 0 | −1 | −2 | −3 |
| Spray cooling fan gears | 3 | 2 | 1 | 0 | 0 | 0 | 0 |
| Spray water flow rate (Water valve opening) | 100% | 60% | 30% | 0 | 0 | 0 | 0 |

The present invention also provides a method for controlling a spray cooling fan based on computer vision technology, which comprises following steps.

S1 The map of the control area of the spray cooling fan, outdoor air temperature, humidity and ground temperature are obtained. Comparing the outdoor air temperature with the outdoor air temperature threshold, the step S2 will be taken if the outdoor air temperature is greater than the outdoor air temperature threshold.

S2 The video of the control area of the spray cooling fan is acquired to determine whether there is a person active in the control area and the thermal posture of the active person. If there is a person in the control area with a thermal posture, the facial skin temperature of the person is obtained.

S3 According to the personal facial skin temperature, the outdoor air temperature, the outdoor air humidity and the ground temperature, the personnel thermal sensation is acquired. Then the group thermal sensation in the control area is calculated. Comparing the group thermal sensation with the group thermal sensation threshold, the step S4 will be taken if the group thermal sensation is greater than the group thermal sensation threshold.

S4 The two-dimensional position coordinates of the personnel in the control area and the initial position of the spray cooling fan are acquired. The target area is the area with the largest number of people in the control area. A rectangular box is used to frame the people in the target area on and within the rectangular border. The location which is 0.5 m outside the rectangular box and the closest to the spray cooling fan is the optimal position for the spray cooling fan. The optimal route of the mobile spray cooling fan from the initial positioning to the optimal position of the spray cooling fan is calculated through ant colony algorithm.

S5 According to the optimal route, the spray cooling fan is controlled to move to the optimal position of the spray cooling fan.

S6 The person in the target area is required whether to turn on the fan and the spray.

S7 If the fan and/or the spray need(s) to be turned on, the fan and/or the spray are controlled to turn on to the gear and/or flow rate corresponding to the group thermal sensation.

S8 Although the outdoor air temperature in the step S1 is not greater than the outdoor air temperature threshold, or the thermal posture of the person is not captured in the step S2, or the group thermal sensation in the step S3 is not greater than the group thermal sensation threshold, the fan and/or spray need(s) to be turned on. In this case, the ground temperature is not compared with the ground temperature threshold.

S9 When outdoor air temperature in the step S1 is not greater than the outdoor air temperature threshold, or the thermal posture of the person in the step S2 is not captured, or the group thermal sensation in the step S3 is not greater than the group thermal sensation threshold, or the fan and the spray does not require to be turned on in the step S6, the ground temperature is compared with the ground temperature threshold. If the ground temperature is greater than the ground temperature threshold, the step S10 will be taken.

S10 The map of the control area is divided into 1×1 m² small squares. Then the temperature of the center of each small square, all small squares whose ground temperature exceeds the outdoor ground temperature threshold and the position of the spray cooling fan are acquired. The optimal route that the spray cooling fan start with the position at this moment and pass by the center of the small squares that need to be cooled is calculated through ant colony algorithm.

S11 According to the optimal route, the spray cooling fan is controlled to cool the ground.

Compared with the prior technologies, the present invention has the following beneficial effects:

The present invention provides a spray cooling fan control system based on computer vision technology, which includes the data acquisition system, the information processing system, the mobile control system, the intelligent voice interaction system and the terminal control system. The data acquisition system provides real-time monitoring of the thermal comfort of personnel in a thermal environment through a variety of non-contact measurement methods, which makes sure the information is accurate and timely, personnel thermal comfort and energy saving. According to the personnel skin temperature and thermal sensation, the air volume and spray volume of the spray cooling fan in real-time is adjusted through the information processing system. The mobile route of the spray cooling fan is planned. The mobile control system controls the spray cooling fan to move to the optimal position, which enhances the mobility and flexibility of the spray cooling fan. The intelligent voice interaction system and the terminal control system intelligently and humanly open the spray cooling fan. The persons in the environment truly become the subject who controls the environmental temperature and optimize the usage of equipment. Consequently, the personnel can be cooled precisely and quickly meeting the thermal environment regulation and personnel thermal needs.

Further, the data acquisition system of the present invention includes the personnel data acquisition module, the environmental data acquisition module and the positioning module. The personnel data acquisition module, environmental data acquisition module and positioning module are used for contactless measurement. Multiple contactless measurement methods are verified against each other to prevent misjudgment, which improves the accuracy and robustness of the system control. Meanwhile, the computer vision and the biological real-time machine learning systems are combined to improve the accuracy and real-time of the information collected by the data acquisition system.

Further, the present invention obtains the group thermal sensation of the person in the control area through the optimization detection module of the spray cooling fan information processing system. According to the distribution and density of personnel in the control area and the ultrasonic obstacle avoidance module, the optimal route selection module obtains the target area of the spray cooling fan to plan the movement route of the spray cooling fan. According to the movement, the planning route makes the spray cooling fan move safely and accurately to the optimal cooling and spraying location, which enhances the mobility and flexibility of the spray cooling fan and achieves precise cooling of personnel.

Further, the present invention analyzes the characteristics of the data in the data collection system through the optimization detection module of the information processing system. The small and representative amount of data is extracted, the data information processing process is simplified, and the accuracy and speed of the system control of the present invention are improved.

The present invention provides a spray cooling fan control system based on computer vision technology. According to the location of personnel in the control area, the personnel distribution density, and the ambient temperature, the spray cooling fan is opened to timely and accurately cool and dedust personnel thermal sensation and road temperature. This not only meets the thermal comfort of personnel in a thermal environment and ambient air quality requirements, but also ensures that the ground temperature in a good state. The purpose and effect of low carbon, green, environmental protection, energy saving and people-demanding are achieved.

Further, according to the personal skin temperature and thermal sensation in this environment, the control method to adjust the air volume and spray volume of the spray cooling fan in real time is intelligent and humanized. Consequently, the people in the environment become the subject of the spray cooling fan of the optimal equipment of the environment temperature.

Figure 1:
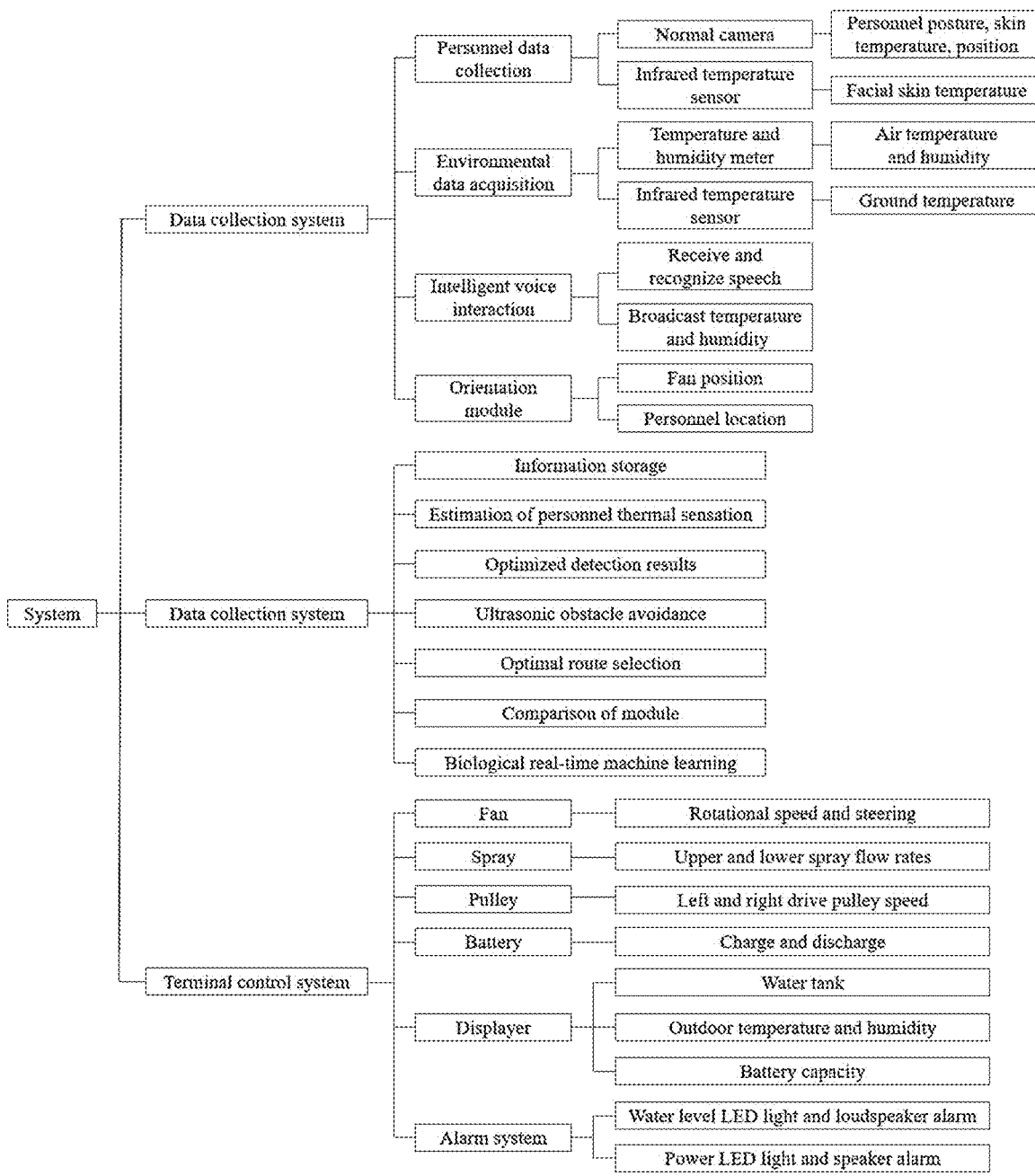
FIG. 1 is a schematic diagram of the structure of a spray cooling fan control system based on the computer vision technology of the present invention.

In the accompanying drawings: 1 fan; 2 spray; 3 ultrasonic range transducers; 4 steering engine; 5 infrared temperature sensors; 6 power alarm; 7 water alarm; 8 ground spray; 9 left drive wheels; 10 right drive wheels; 11 displayer; 12 voice announcement hole; 13 camera; 14 infrared ground temperature sensor.

DETAILED DESCRIPTION OF EMBODIMENTS

The present invention is described, which combines with the accompanying drawings and specific embodiments.

As shown in FIGS. 1-4, the present invention provides an intelligent mobile spray cooling fan system based on computer vision technology, which comprises the data acquisition system, the information processing system, the mobile control system, the intelligent voice interaction system, the terminal control system, the biological real-time machine learning system, the alarm system and the ground cooling system.

1. The data acquisition system is used to collect the posture, facial skin temperature and position of a person in a control area, the initial position of a spray cooling fan, air temperature, air humidity and ground temperature. Compared with the outdoor air temperature threshold, when the outdoor air temperature is greater than the outdoor air temperature threshold, the data is transmitted to the information processing system.

The data collection system specifically comprises the personnel data collection module, the environmental data collection module and the position module.

1.1 Personal data acquisition module is used to collect the personal posture, the facial skin temperature and the position, which specifically includes the camera 13 and the infrared temperature sensor 5. The infrared temperature sensor 5 is used to collect the facial skin temperature of the person, and the camera 13 is used to collect the person video. The camera 13 has the built-in skeletal node recognition module, the Euler video amplification module and the YOLOv5 module. The skeletal node recognition module uses the OpenPose algorithm to acquire a digital image matrix of the personal posture. The Euler video amplification module uses the Euler video amplification algorithm to obtain the facial skin temperature of the person. The YOLOv5 module uses the YOLOv5 algorithm to calculate personal distribution and density.

The infrared temperature sensor 5 and the camera 13 simultaneously acquire the cross validated personnel facial skin temperature to improve the accuracy and robustness of detection.

1.2 The environmental data acquisition module is used to acquire the air temperature and air humidity near the spray cooling fan and the ground temperature in the control area, which specifically includes the air temperature sensor, the air humidity sensor and the infrared ground temperature sensor 14. The air temperature sensor, the air humidity sensor and the infrared ground temperature sensor 14 are used to acquire the air temperature, the air humidity and the ground temperature, respectively.

1.3 The position module is used to calculate the position of the spray cooling fan and the person, which includes the spray cooling fan locator and ultrasonic distance meter. The spray cooling fan locator is set in the lower part of the spray cooling fan. The spray cooling fan location uses GPS to collect the position of the spray cooling fan. The ultrasonic distance meter measures the distance between the person and the spray cooling fan. According to the distribution and density of personnel and the distance between the person and the spray cooling fan, the location of the personnel on the map is obtained.

2. The information processing system is used to obtain the data information, and optimize the data information to obtain the group thermal sensation, the optimal position of the spray cooling fan and the real-time obstacle avoidance information of the spray cooling fan movement. Compared with the group thermal sensation threshold, when the group thermal sensation is greater than the group thermal sensation threshold, the information processing system obtains the optimal route of the spray cooling fan movement through the initial position of the spray cooling fan, the optimal position of the spray cooling fan and the real-time obstacle avoidance information of the spray cooling fan movement.

The information processing system specifically comprises the optimization detection module, the optimal route selection module and the ultrasonic obstacle avoidance module.

2.1 The optimization detection module is used to modify the mathematical model of the facial skin temperature of the person, the outdoor air temperature and humidity in the control area, the ground temperature and the personal thermal sensation. Then the thermal sensation of each person is calculated. The thermal sensation of each person is optimized and integrated, which obtains the group thermal sensation through the fuzzy comprehensive evaluation method. When the group thermal sensation is greater than the group thermal sensation threshold, the group thermal sensation is transmitted to the ultrasonic obstacle avoidance module, the optimal route selection module and the terminal control system.

2.2 The ultrasonic wave obstacle avoidance module is used to transmit and receive ultrasonic wave, which obtains the distance of the spray cooling fan, the person and obstacles and the position coordinates of personnel in the control area. The location which is 0.5 m around the target area and the closest to the spray cooling fan is the optimal position for the spray cooling fan. Then the real-time obstacle avoidance information of the spray cooling fan movement and the optimal position of the spray cooling fan are sent to the optimal route selection module.

Preferably, the distance between the position of the spray cooling fan and the mobile person and the distance between the spray cooling fan and the mobile person (obstacle) in the moving process are considered as the distance data.

2.3 The optimal route selection module is used to obtain real-time obstacle avoidance information of the spray cooling fan movement and the optimal position of the spray cooling fan. The optimal route from the initial position to the optimal position is calculated through the ant colony algorithm. Then the optimal route is transmitted to the mobile control system.

3. According to the optimal route and the real-time obstacle avoidance information, the mobile control system drives the spray cooling fan to move the optimal position by controlling the left drive wheel 9 and the right drive wheel 10 located at the bottom of the spray cooling fan. Then the position of the mobile control system is transmitted to the intelligent voice interaction system.

4. The intelligent voice interaction system is used to obtain the position of the spray cooling fan and to inquire the person around the spray cooling fan whether to turn on spray 2 and/or fan 1. The voice information from the outside is recognized. Then the air temperature and humidity are broadcasted through the voice announcement hole 12 on the spray cooling fan. Finally, the voice command of the person is transmitted to the terminal control system.

5. The terminal control system is used to acquire the voice command of the person and to control the opening of the spray cooling fan based on the group thermal sensation, specifically.

The terminal control system receives the voice command of the person to turn off the spray 2 and/or fan 1 device from the intelligent voice interaction system. According to the group thermal sensation, the terminal control system adjusts the fan and/or the spray opening by the fan gear and the spray water flow valve opening corresponding.

The terminal control system receives the voice command of the person to turn off the spray 2 and/or fan 1 device from the intelligent voice interaction system. When the group thermal sensation is less than the group thermal sensation threshold, the terminal system turns off the spray 2 and/or fan 1 device.

The terminal control system includes the terminal controller, which controls the terminal device according to the optimal route. The terminal device includes the fan 1, the spray 2, the solar photovoltaic panel 15, the storage battery and the displayer 11. The solar photovoltaic panel 15 converts sunlight into available electrical energy and stores it in the storage battery. Then the power in the storage battery continuously provides the power to the spray cooling fan. The displayer 11 can timely display the water level of the water tank, the remaining battery power, the outdoor air temperature, the outdoor air humidity, the spray cooling fan gear and the spray water flow.

6. The biological real-time machine learning system is used to store the facial skin temperature of the person, the outdoor air temperature, the outdoor air humidity, the outdoor ground temperature, the group thermal sensation, the personal distribution, the optimal route and the fan speed and/or spray water volume. According to the above data, the personal preference in the active area and the group thermal preference are calculated.

7. The alarm system is used to alar and warn the water level of the water tank and the remaining power of the battery, which includes the module of level alarm of water tank and the power alarm module. When the water level is less than 30% and/or the remaining battery power is less than 20%, the alarm system alarms. Then the information processing system obtains the alarm information. According to the position of the spray cooling fan, the optimal route of the spray cooling fan from this location to the water storage room is calculated through ant colony algorithm. The mobile control system drives the left drive wheel 9 and the right drive wheel 10 of the spray cooling fan to move to the water storage room.

8. The ground cooling system is used to cool the outdoor ground in the control area.

1) When the personal command directly obtained from the intelligent voice interaction system is turning on the fan 1 and/or spray 2, the ground cooling system is not turned on.

2) When the outdoor air temperature is not greater than the outdoor air temperature threshold, or the personnel thermal posture is not captured, or the group thermal sensation is not greater than the group thermal sensation threshold, or the personnel voice command is not need to turn on the fan and/or sprays, the data acquisition system acquires the outdoor ground temperature. When the outdoor ground temperature is greater than the outdoor ground temperature threshold, the data acquisition system divides the control area map into 1*1 m2 small squares. Not only the temperature at the center of each small square, but also all small squares where the outdoor ground temperature exceeds the outdoor ground temperature threshold are obtained.

The information processing system obtains the position of the spray cooling fan at this moment. The optimal route from the initial positioning of the spray cooling fan to the optimal position of the spray cooling fan is calculated through ant colony algorithm.

The mobile control system moves the spray cooling fan according to the optimal route of the spray cooling fan movement. Meanwhile, the ground cooling system turns on the ground spray 8 to cool the ground.

When the spray cooling fan reaches the final position, the mobile control system stops the spray cooling fan moving. Then the ground cooling system controls the ground spray 8 devices to turn off. When the outdoor ground temperature is less than the outdoor ground temperature threshold, the ground cooling system is not turned on. Further, the camera 13 of the human data acquisition module and the infrared temperature sensor 5 are set in the lower part of the spray cooling fan.

Further, the air temperature sensor and the air humidity sensor of the environmental data acquisition module are set in the lower housing of the spray cooling fan with ventilation holes, and the infrared ground temperature sensor 14 is set in the lower part of the spray cooling fan.

Further, the optimal route planning in the optimization detection module uses the ant colony algorithm to search for the shortest path.

Further, the camera has the built-in skeletal node recognition module. The skeletal node recognition module uses the OpenPose algorithm to recognize the thermal posture of the human body related to the body's thermal regulation mechanism. The OpenPose algorithm uses a 2D posture detection method PAF (Part Affinity Fields) in multi-person images and a bottom-up approach to first detect each joint point of the person. Then each joint point is associated with the person to complete the pose detection in multi-person images. The OpenPose algorithm consists of four main steps: neural network; find joint; find limb connection and assemble limbs to form a person.

Further, the camera has a built-in Euler video amplification module, which uses the Euler video amplification algorithm to perform a Fourier transform on the facial image of the person. The skin tone saturation of the person is obtained, and there is a linear relationship between the skin temperature and the skin tone saturation. The facial skin temperature of person is obtained after the transformation.

Further, the camera has a built-in YOLOv5 module, which uses the YOLOv5 algorithm and a single-stage detection method (One-stage) to quickly obtain the real-time position of the person.

Further, based on the facial skin temperature of the person, the outdoor air temperature, the outdoor air humidity, the ground temperature and the human thermal sensation, the mathematical model uses the following equation:

$$TSV_i = a + k_1 \times T_a + k_2 \times RH_a + k_3 \times T_{1i} + k_4 \times T_{2i} + k_5 \times T_f$$

Where, $TSV_i$ is the thermal sensation of the i-th person, as the linear function of the person's facial skin temperature, the outdoor air temperature, the outdoor air humidity and the ground temperature.

$T_a$—Outdoor air temperature;

$RH_a$—Outdoor air humidity;

$T_{1i}$—Facial skin temperature of the i-th person calculated by the Euler video amplification module;

$T_{2i}$—The facial skin temperature of the i-th person collected by the infrared temperature sensor 5;

$T_f$—Ground temperature collected by infrared ground temperature sensor 14;

$K_1$、$K_2$、$K_3$、$K_4$、$K_5$—Parameters of the linear regression model;

a—Intercept distance.

Further, the thermal sensation of the same person fluctuates in the same outdoor thermal environment at different times. Their activity level and metabolic rate is constantly changes. Thus the thermal sensation of each person in the control area varies from moment to moment. The personnel data acquisition module timely obtains the thermal sensation of each person. Since the motion state of different personnel is not exactly the same in the same outdoor thermal environment at the same time. Even in the same state of motion, different people have individual comfort temperature ranges. Therefore, there are differences in the thermal sensation of each person in the control area. Obtaining the thermal sensation of each member makes the outdoor environment to meet the requirements of thermal comfort of most personnel as much as possible. According to the fuzzy comprehensive evaluation method, the group thermal sensation $TSV_q$ is calculated by the formula:

$$TSV_q = a_1 TSV_1 + a_2 TSV_2 + \ldots + a_m TSV_m$$

The $TSV_q$ is the group thermal sensation in the control area, which is a linear function of the real-time thermal sensation of each person. $a_m$ is the m-th personal thermal sensation weigh factor, which represents the degree of influence of the m-th personal thermal sensation on the group thermal sensation, and $$\sum_1^m a_m = 1.$$

The weight of all persons in the area is set to be equal for regulating the summer outdoor thermal environment area, and $$a_1 = a_2 = \ldots = a_m = \frac{1}{m}.$$

If the thermal sensation of a person in the control area exceeds the upper threshold, the weight factor of this person is appropriately increased to meet the thermal comfort of this person. $TSV_m$ is the real-time thermal sensation of the m-th person.

Thermal sensation vote is the personnel subjective response and description of whether the surrounding thermal environment is cold or hot. According to ASHRAE 55 (2020), the thermal sensation vote uses a 7-point scale and the corresponding gear of fan 1 and flow rate of spray 2 of the spray cooling fan:

| Thermal Description | Hot | Warm | Slightly warm | Normal | Slightly cool | Cool | Cold |
|---|---|---|---|---|---|---|---|
| TSVn numerical values | 3 | 2 | 1 | 0 | −1 | −2 | −3 |
| Spray cooling fan gears | 3 | 2 | 1 | 0 | 0 | 0 | 0 |
| Spray water flow rate (Water valve opening) | 100% | 60% | 30% | 0 | 0 | 0 | 0 |

Further, the position module uses GPS to find the initial position of the spray cooling fan. After obtaining personnel distribution according to the personnel data collection module, the spray cooling fan moves from the initial position to the final optimal position in the optimization detection module. When the personnel distribution and the initial position of the spray cooling fan are determined, the ultrasonic distance measuring transducer 3 obtain the coordinates of the personnel in the control area by transmitting and receiving the position of person and the spray cooling fan. The area with the highest number of people in the location coordinates is the target area. A rectangular box is used to frame the people in the target area on and within the rectangular border. The location which is 0.5 m outside the rectangular box and the closest to the spray cooling fan is the optimal position for the spray cooling fan. According to the criterion of the shortest moving path, the spray cooling fan avoids fixed obstacles. The optimal path of the intelligent spray cooling fan is calculated through ant colony algorithm. The path is optimized to make the lowest cost possible.

Further, there is the non-fixed movement of people in the control area. In order to avoid bumping people and damaging the machine in the area, the ultrasonic obstacle avoidance module timely measures the distance between the spray cooling fan and the obstacle during the movement of the intelligent spray cooling fan. The ultrasonic obstacle avoidance module uses the ultrasonic distance measuring transducer 3, which is mounted on the 180° steering engine 4 and timely transmits and receives ultrasonic waves. This device measures the distance of each angle of the obstacle with the rotation of the steering engine 4.

Figure 2:
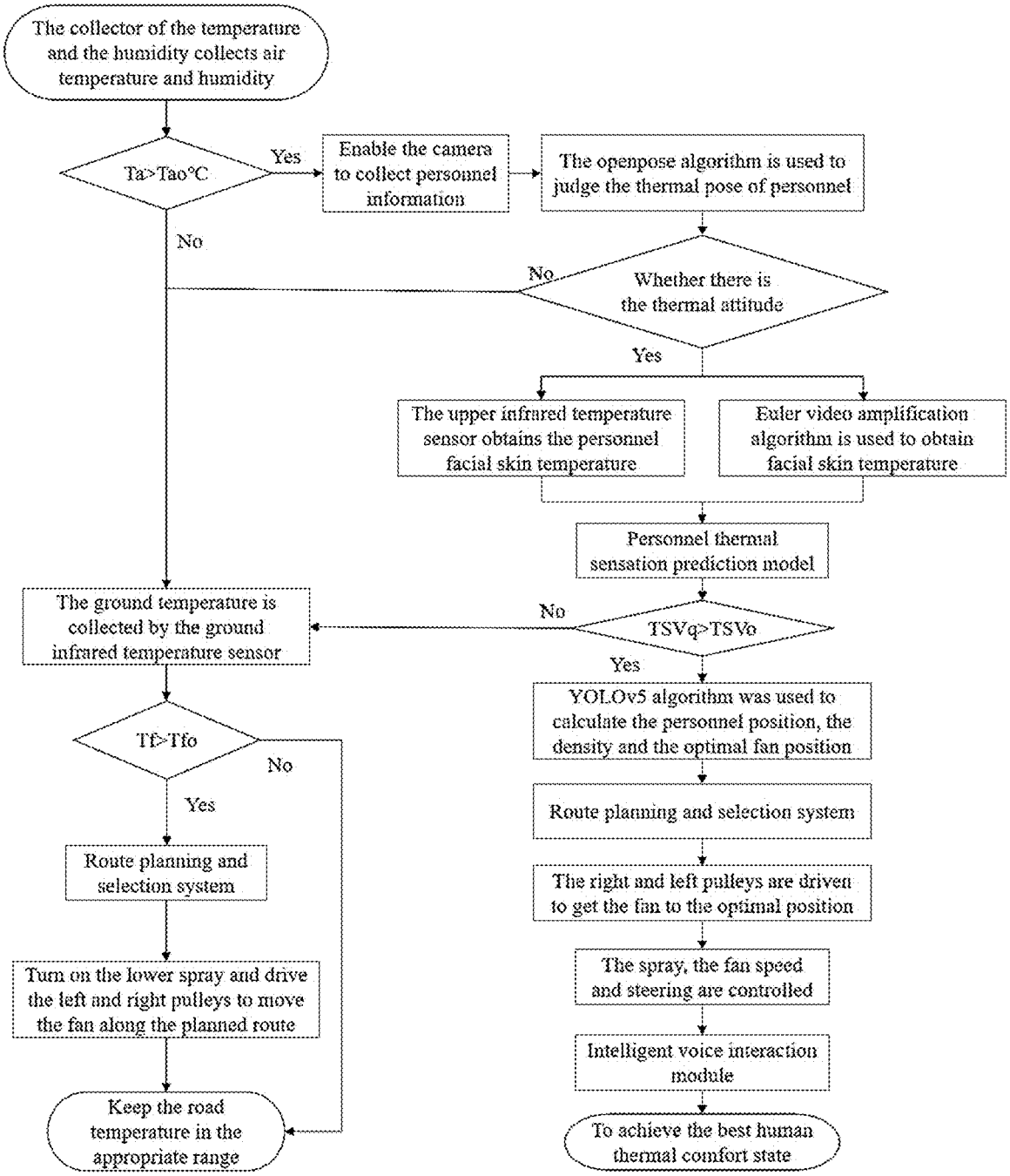
FIG. 2 is a flow chart of the work of the spray cooling fan control system based on the computer vision technology of the present invention.

As shown in FIG. 2, the present invention discloses the control method of the spray cooling fan control system for the outdoor thermal environment based on computer vision technology, which comprises the following steps.

S1 The system determines the control area of the spray cooling fan and obtains control area map.

S2 The system obtains the control area of the outdoor air temperature $T_a$, the outdoor air humidity $RH_a$ and the ground temperature $T_f$. Compared with the outdoor air temperature threshold $T_{ao}$, if the outdoor air temperature $T_a$ is greater than the outdoor air temperature threshold $T_{ao}$, the following steps will be taken:

S3 This system obtains the video of the person in the control area and distinguishes whether there is personnel activity and the thermal posture of the active person in the control area. If there is personnel thermal posture in the control area, the system obtains the facial skin temperature of the person through the Euler video amplification algorithm and the infrared sensor.

S4 According to the mathematical model of the facial skin temperature of the person, the outdoor air temperature and humidity in the control area, the ground temperature and the personal thermal sensation modify, the thermal sensation of each person is calculated. If the group thermal sensation is less than the group thermal sensation threshold, the spray cooling fan 1 and spray 2 will not be turned on. If the group thermal sensation is greater than the group thermal sensation threshold, step S5 will be performed.

Specifically, the thermal posture includes "wipe sweat", "fan with hands", "shake T-shirt", "scratch head", "roll up sleeves", etc.

S5 This system obtains the two-dimensional coordinates of the person in the control area and the initial position of the spray cooling fan. The area with the largest number of persons in the position coordinates is viewed as the target area. A rectangular box is used to frame the people in the target area on and within the rectangular border. The location which is 0.5 m outside the rectangular box and the closest to the spray cooling fan is the optimal position for the spray cooling fan.

S6 The system uses the initial position and the optimal position of the spray cooling fan, which calculates the optimal route to move the spray cooling fan through ant colony algorithm.

S7 The spray cooling fan moves to the optimal position according to the optimal route.

Figure 3:
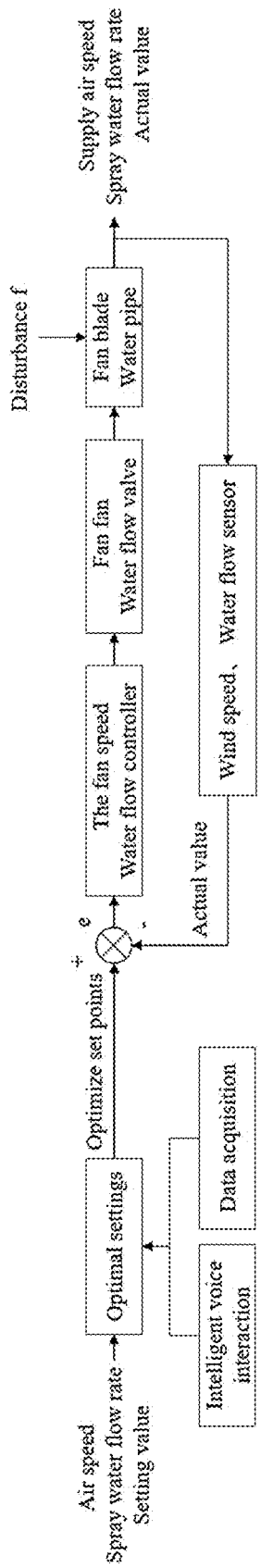
FIG. 3 is a control logic diagram of the control system of the present invention to control the temperature and spray of a spray cooling fan.
Figure 4:
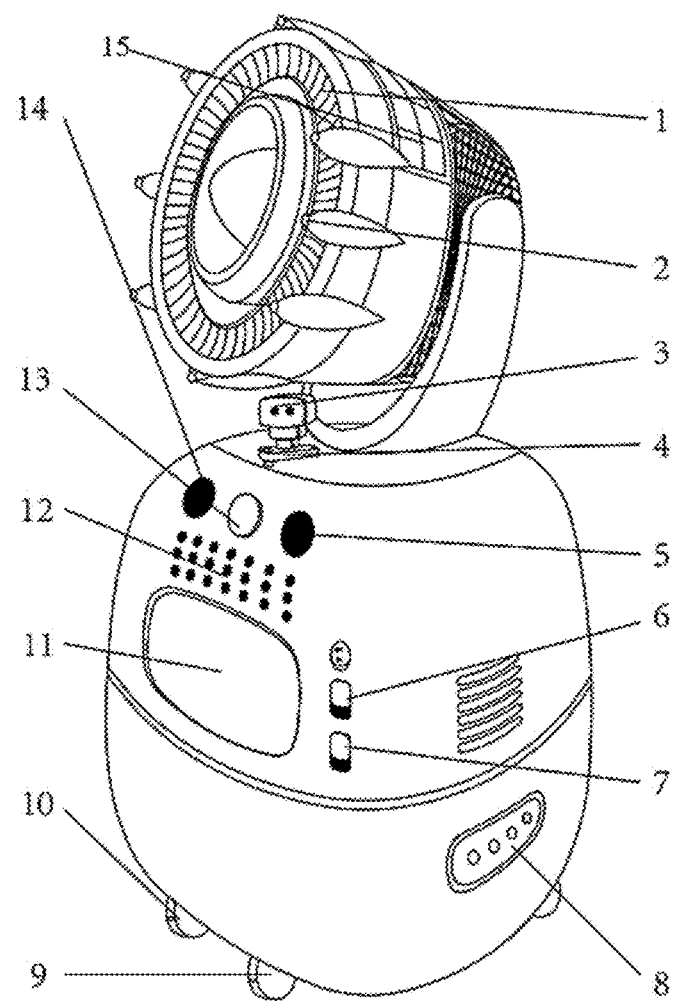
FIG. 4 is a schematic diagram of the structure of a spray cooling fan based on the computer vision technology of the present invention.

S8 As shown in FIG. 3, the person in the target area are inquired whether turn on the fan 2 and the spray 2. Then the feedback voice information is acquired. If fan 1 and/or spray 2 need(s) to be turned on, the terminal controller will give the controlling command to the spray cooling fan or the spray water flow valve. According to the group thermal sensation, the system opens the fan and/or the spray by opening the fan gear and the spray water flow valve corresponding. Meanwhile, the outdoor air temperature, the outdoor air humidity, the group thermal sensation, the personnel distribution and the optimal route are stored.

S9 Although the outdoor air temperature in the step S2 is not greater than the outdoor air temperature threshold, or the thermal posture of the person is not captured in the step S3, or the group thermal sensation in the step S4 is not greater than the group thermal sensation threshold, the fan 1 and/or spray 2 need(s) to be turned on. In this case, the ground temperature is not compared with the ground temperature threshold.

S10 Although the outdoor air temperature in the step S2 is not greater than the outdoor air temperature threshold, or the thermal posture of the person is not captured in the step S3, or the group thermal sensation in the step S4 is not greater than the group thermal sensation threshold $T_{fo}$, the fan 1 and/or spray 2 not need(s) to be turned on in the step S8. In this case, the ground temperature is compared with the ground temperature threshold. If the ground temperature is greater than the ground temperature threshold, the next step will be taken.

S11 The map in the control area is divided into 1×1 m² small squares, whose center is the measurement point of the infrared ground temperature sensor 14. The infrared ground temperature sensor 14 measures the temperature of the center point of all small squares, and gets all the small squares and their center points whose outdoor ground temperature exceeds the outdoor ground temperature threshold. The positions at these points are obtained by GPS. The optimal route from the position to the center point of the small square that needs to be cooled is calculated through ant colony algorithm.

S12 The mobile control system controls the left drive wheel 9 and the right drive wheel 10. The terminal control system opens the ground spray 8 and moves the spray cooling fan spray according to the optimal route.

Example 1

When the person is cooled and regulated the summer outdoor condition, the device further regulates the condition based on the presence of people in the control area. The device needs to move according to the distribution of people. Thus the device needs to obtain the presence of people in the control area through camera 1 and the facial skin temperature of person. Then the optimal route is calculated through the distribution of the person.

The camera relies on the built-in skeletal node recognition module, which uses the OpenPose algorithm to obtain human body joint points mainly including four steps ① neural network prediction; ② find joint; ③ find limb connection point; ④ assemble limbs to form the person splicing. When the camera captures the moving person in the control area, the OpenPose algorithm is used to extract timely the image features and the personal thermal posture from the video. Then the personal thermal posture is compared with the thermal posture in the database including "wipe sweat", "fan with hands", "shake T-shirt", "scratch head", "roll up sleeves", etc. If the camera recognizes the posture of the "fan with hands", the skeletal node recognition module will give the command to the next process.

The Euler video amplification algorithm get the facial skin tone saturation of the person through performing the Fourier transform. There is a linear relationship between the skin temperature and the skin tone saturation. The personnel facial skin temperature is obtained after the transformation. The Euler video amplification algorithm is referred to the Part 3 of Phase-Based Video Motion Processing. There may be interference with the captured video images to obtain the personal facial skin temperature. For example, the person will have hats and other accessories shading their face, which makes the personnel facial skin temperature collected by the Euler video amplification algorithm is different from the actual skin temperature. In order to avoid misjudgment and improve the accuracy of the personal facial temperature during the surveillance, the infrared temperature sensor 5 timely monitors and collects the skin temperature at the same time. The personal facial skin temperature obtained by both acquisition methods is stored in the information storage module and sent to the personal thermal sensation prediction module of the information processing system for the next step in the process.

More preferably, the thermal sensation of each person varies from different activity intensity, clothing insulation and outdoor environmental parameters. Thus the personal thermal sensation needs to be acquired in realtime.

The information processing system also includes the personal thermal sensation estimation module. The personal thermal sensation correlates not only with the personal facial skin temperature but also with the outdoor air temperature, outdoor air humidity and ground temperature in the control area strongly. The personal thermal sensation estimation module receives the personal data and environmental data timely. The mathematical model between the above data and the personal thermal sensation is calculated through the statistical learning methods:

$$TSV_i = a + k_1 \times T_a + k_2 \times RH_a + k_3 \times T_{1i} + k_4 \times T_{2i} + k_5 \times T_f$$

Where, $TS_i$—outdoor air temperature measured by the outdoor thermometer;

$T_a$—Outdoor air temperature measured by the outdoor thermometer;

$RH_a$—Outdoor air humidity measured by the outdoor humidity meter;

$T_{1i}$—Facial skin temperature of the i-th person calculated by the Euler video amplification module from the camera;

$T_{2i}$—The facial skin temperature of the i-th person collected by the infrared temperature sensor 5;

$T_f$—Ground temperature collected by infrared ground temperature sensor 14;

$K_1$, $K_2$, $K_3$, $K_4$, $K_5$—Parameters of the linear regression model;

a—Intercept distance.

In the actual measurement process, there are differences in the perception of the thermal environment of each person. The group thermal sensation of multiple persons needs to be calculated. The group thermal sensation is used as the group judgment parameter of the thermal environment, which makes the intelligent control of the outdoor environment meet the requirements of thermal comfort of most personnel as much as possible. This patent uses the fuzzy comprehensive evaluation method:

$$TSV_q = a_1 TSV_1 + a_2 TSV_2 + \ldots + a_m TSV_m$$

The $TSV_q$ is the group thermal sensation in the control area, which is a linear function of the real-time thermal sensation of each person. $a_m$ is the m-th personal thermal sensation weigh factor, which represents the degree of influence of the m-th personal thermal sensation on the group thermal sensation, and $$\sum_{1}^{m} a_m = 1.$$

The weight of all persons in the area is set to be equal for regulating the summer outdoor thermal environment area, and $$a_1 = a_2 = \ldots = a_m = \frac{1}{m}.$$

If the thermal sensation of a person in the control area exceeds the upper threshold, the weight factor of this person is appropriately increased to meet the thermal comfort of this person. $TSV_m$ is the real-time thermal sensation of the m-th person.

The predicted value obtained by the above method is close to the real value but does not fully represent the real thermal sensation of the person in the control area. There is still a certain error. In order to avoid the waste of energy, the intelligent voice interactive system need to inquire the personnel whether they want to turn on fan 1 and/or spray 2 or not before opening the fan 1 and/or spray 2. Finally, the response received by the intelligent voice interaction system is the valid information, and then the fan 1 and/or spray 2 are regulated accordingly.

The camera has a built-in YOLOv5 module, which uses the YOLOv5 algorithm and a single-stage detection method (One-stage) to obtain the distribution and density of the person timely. The input image is put directly into the deep neural network for prediction to get the target detection result finally. More preferably, after the steering engine 4 moving to the positions detecting the personnel and the spray cooling fan according to the YOLOv5 algorithm, the ultrasonic distance measuring transducer 3 of the ultrasonic obstacle avoidance module measures the distance of the personnel and the spray cooling fan in the control area by transmitting and receiving ultrasonic waves. The two-dimensional position coordinates of the personnel in the map of the control area are gotten. The optimal position of the spray cooling fan is 0.5 meters outside the area with the largest number of personnel in the two-dimensional position coordinates.

The camera recognizes the presence of the thermal posture of personnel in the control area. When the group thermal sensation is greater than the group thermal sensation threshold, the personnel position is calculated through the YOLOv5 algorithm. Then the YOLOv5 module issues instructions for the next process.

The optimal detection module searches for the optimal route of the spray cooling fan to the optimal position through the ant colony algorithm. The starting position is the position of the spray cooling fan at this moment, and the end position is the optimal position obtained by optimizing the distribution of people. The spray cooling fan moves with minimum work cost (shortest walking path), which avoids obstacles to reach the optimal position. The ant colony algorithm ACO is a probabilistic algorithm. The next search direction is determined by the amount of residual pheromones in each path in the environment.

The environment around the spray cooling fan is expressed as a set of data. The raster method is used to view the surrounding environment as a two-dimensional plane. The plane is divided into grids with the same area size to build a two-dimensional environment model. Each grid stores the amount of information about the surrounding environment. The environmental map information is labeled using the ordinal number method. The environmental information is converted into the data that can be recognized by the spray cooling fan. The raster map is a sequential accumulation of raster numbers from 1 to the last raster. The i-th raster corresponds to the location of:

$$\begin{cases} x_i = a \times \left[ \text{mod}\,(i, y) - \frac{a}{2} \right] \\ y_i = a \times \left[ x + \frac{a}{2} - \text{ceil}\left(\frac{i}{x}\right) \right] \end{cases}$$

Where, $x_i$—Distance in the x-direction of the i-th raster;
$y_i$—Distance in the y-direction of the i-th raster;
a—Side length of each small square pixel;
ceil(n)—Take the smallest integer greater than or equal to the value n;
mod(i,y)—i except for remainder of y.
Length of each strip from start to finish:

$$D_{si,sj} = \sqrt{(x_i - x_j)^2 + (y_i - y_j)^2}$$

Of which, $D_{si,sj}$—Distance from start to finish.

The spray cooling fan uses an octree search strategy in which the spray cooling fan is free to move towards adjacent grids in eight nearby directions during the search.

The ant colony algorithm comprises the following four main steps.

① Initialization of relevant parameters

The colony size (number of ants) m, the pheromone importance factor α, the heuristic function importance factor β, the pheromone volatility factor ρ, the total amount of pheromone released Q, and the maximum number of iterations K.

② The distance of each raster to the target point is calculated according to the above equation. The heuristic pheromone is taken as the reciprocal of the distance to the target point. The shorter the distance is, the larger the heuristic factor is. The heuristic information at the obstacle is 0. The matrix D is created, which is used to store the surrogate values of each raster point to its respective neighboring accessible raster points.

③ For each ant, the path and the length of the path are initialized and the taboo list is initialized to 1. The ants start to search the path from the starting point, and find out all the neighboring raster points without obstacles (raster points whose corresponding elements in matrix D are not 0). Then the current selectable grid points are filtrated according to the taboo list.

④ If the starting point is the target point and the number of available raster points is not less than 1, the probability that the ant will move from the current raster point to each neighboring raster point is:

$$P_{i,j}^k(t) = \begin{cases} \dfrac{[\tau_{i,j}(t)]^\alpha \square [\eta_{i,j}]^\beta}{\sum_{j \notin J^k} [\tau_{i,j}(t)]^\alpha \square [\eta_{i,j}]^\beta} & j \notin J^k \\ 0 & j \in J^k \end{cases}$$

Where, i, j Start and end points respectively;
$\tau_{i,j}(t)$ is the time, the pheromone intensity of from I to j at moment t;
$\eta_{i,j}$ is the visibility, which is the reciprocal of i, j the road distance;
α, β are two constants, the weighted values of pheromone and visibility respectively.

According to the roulette wheel method, the next raster point is selected.

⑤ The path of the ant crawl, the path length, the matrix D and the taboo list are updated.

⑥ Repeating the steps ④ and ⑤ until the starting point is the target point or the optional grid point is less than 1. The current ant has finished pathfinding in this iteration, and the route of this ant is recorded.

⑦ If the last step of this ant is the target point, the path length is calculated, and compared with the shortest path length known currently. If the current path length is less than the shortest path length known currently, the current shortest path length and the shortest path are updated. If the last step of this ant is not the target point, only the path length is recorded as 0.

⑧ Repeating steps ③ to ⑦ until M ants complete a round of path search and update the pheromone.

$$\neg \tau_{i,j}^k(N) =$$

$$\begin{cases} (C_k)^{-1} & \text{The } k\text{-}th \text{ ant passes through the point } (i, j) \text{ in this cycle} \\ 0 & \text{others} \end{cases}$$

$$\tau_{i,j}(N+1) = (1-\rho)\tau_{i,j}(N) + \neg \tau_{i,j}(N)$$

$$\neg \tau_{i,j}(N) = \sum_{k=1}^{m} \neg \tau_{i,j}(N)$$

Where, $C_k$ is the total path length obtained by the k ant after taking the entire path;
$\tau_{i,j}(N+1)$ is the pheromone of the path from i to j to at moment N+1;

$0 < \rho \le 1$ is the evaporation rate of the pheromone;

$\tau_{i,j}(N)$ is the pheromone of the path from i to j at moment N;

$\Delta\tau_{i,j}(N)$ is the pheromone left by each ant on paths I to j;

$\Delta\tau_{i,j}^k(N)$ is the pheromone left by the k ant on path i to j.

⑨ Determine whether the termination condition K is satisfied. If it is satisfied, the ant colony algorithm ends the search for the optimum and drawing the optimal planning path. If it is not satisfied, the step ③ is taken.

The optimal path from the current position of the spray cooling fan to the optimal position is found through the ant colony algorithm, which is the shortest path that avoids obstacles. The spray cooling fan can reach the final position quickly and precisely, which saves power. The optimal path obtained by the ant colony algorithm is stored in the information storage module. The biological real-time machine learning system continuously learns from the saved optimal path planning records. The planning stage of the optimal path before the spray cooling fan moving can be retrieved quickly to further reduce the path planning time to improve the efficiency of the spray cooling fan movement.

More preferably, the ultrasonic obstacle avoidance module is used to transmit and receive the ultrasonic information during the movement of the spray cooling fan. The ultrasonic information received in each direction is transformed into distance information and sent to the optimization detection module timely. The adjustment of the spray cooling fan movement route is optimized to avoid damaging the persons in the control area and the spray cooling fan continuously. The timer is used to measure the distance from the time the sound waves are emitted to the time they encounter an obstacle. Half of the total time taken to reflect the ultrasound is multiplied by the speed of propagation of the ultrasound in the air to calculate the actual distance from the spray cooling fan to the obstacle. The ultrasonic distance measurement formula:

$$L = CT$$

Of which, L—the actual distance from the spray cooling fan to the obstacle;

C—the speed of propagation of ultrasonic waves in the air, generally taken as 340 m/s;

T—half of the total time taken from the ultrasonic wave launch to the time when the ultrasonic wave is reflected from the obstacle.

The ultrasonic obstacle avoidance module uses the ultrasonic distance measuring transducer 3, which is mounted on the 180° steering engine 4 and transmits and receives ultrasonic waves timely. This detects the distance between the obstacle and the spray cooling fan at each angle within 180°.

The terminal control system comprises the terminal controller, which is connected to the spray cooling fan 1, the spray 2, the spray battery, the displayer 11, the power alarm 6 and the water alarm 7 to output commands to the above devices. The terminal control system receives information from the information processing system and issues command corresponding to the information to the actuators. This controls the spray cooling fan air supply level, spray water flow, battery charging and discharging, displayer 11 data information display and alarm system to issue alarm alarms timely and accurately. The alarm system includes the water level alarm module and the power alarm module to warn the water storage of the water tank and the spray cooling fan power is insufficient.

Sensors need to be installed on the spray fan motor and the spray water main pipe to monitor the actual fan speed and the actual spray water flow rate. Comparing the actual value with the set value, and giving feedback to the control process ensure the control objectives are achieved. If the terminal controller receives the command from the fan to increase the speed, the fan speed will be regulated according to the difference between the actual airspeed and the set airspeed.

As shown in FIG. 2, The present invention is the control method of the spray cooling fan control system for the outdoor thermal environment based on computer vision technology. It includes the following steps.

S1 The spray cooling fan stores map information to delineate control areas.

S2 The outdoor air temperature collector collects the outdoor air temperature; the outdoor air humidity collector collects the outdoor air humidity; meanwhile, the infrared ground temperature sensor 14 collects the ground temperature. If the outdoor air temperature is greater than the outdoor air temperature threshold, the next step will be taken.

S3 The camera is used to obtain the video about the person in the cooling area. The OpenPose algorithm is used to detect whether there is an person in the control area and determine the thermal posture of the person. If there is a person in the control area with the thermal posture, the step S4 will be performed.

S4 The personal facial skin temperature is obtained through the Euler video amplification algorithm calculates and analyzes the person's video. Meanwhile, the personal facial skin temperature is collected through the infrared temperature sensor 5.

S5 The personal facial skin temperature, the outdoor air temperature, the outdoor air humidity and the ground temperature are brought into the human thermal sensation formula to calculate the human thermal sensation of all persons in the control area.

S6 The human thermal sensation of all personnel in the control area is brought into the group thermal sensation formula to calculate the group thermal sensation. If the group thermal sensation is less than the group thermal sensation threshold, the spray cooling fan 1 and spray 2 will not be turned on. Inversely, the spray cooling fan 1 and/or spray 2 will be turned on, and the step S7 will be performed.

S7 The 2D positioning coordinate of the person in the map of the control area is calculated by the YOLOv5 algorithm combinated with the ultrasonic ranging transducer 3. The initial position of the spray cooling fan is obtained by GPS. The area with the highest number of the person on the map is the target area. A rectangular box is used to frame the people in the target area on and within the rectangular border. The initial location which is 0.5 m outside the rectangular box and the closest to the spray cooling fan is the optimal position for the spray cooling fan.

S8 The optimal route of the mobile spray cooling fan from the initial positioning to the optimal position of the spray cooling fan is calculated by the ant colony algorithm.

S9 The mobile control system outputs the commands to the left drive wheel 9 and the right drive wheel 10 to move the spray cooling fan to the optimal position following the optimal route.

S10 The spray cooling fan sends the voice inquiring message to the person in the target area, which is whether to turn on fan 1 and/or spray 2 or not. If it is necessary to turn on fan 1 and/or spray 2, the terminal controller will send the command to the fan and/or the spray water flow valve, which makes the spray cooling fan and spray run in the gear and the flow rate corresponding to the group thermal sensation. Then the outdoor air temperature, the outdoor air humidity, the group thermal sensation in the control area, the personal position and the optimal routes are stored.

S11 Although the outdoor air temperature in the step S1 is not greater than the outdoor air temperature threshold, or the thermal posture of the person is not captured in the step S2, or the group thermal sensation in the step S3 is not greater than the group thermal sensation threshold, the ground temperature will not be compared with the ground temperature threshold when the fan 1 and/or spray 2 need(s) to be turned on.

S12 When outdoor air temperature in the step S2 is not greater than the outdoor air temperature threshold, or the thermal posture of the person in the step S3 is not captured, or the group thermal sensation in the step S6 is not greater than the group thermal sensation threshold, or the fan 1 and the spray 2 does not require to be turned on in the step S10, the ground temperature is compared with the ground temperature threshold. If the ground temperature is greater than the ground temperature threshold, the following step will be taken.

S13 The map in the control area is divided into 1×1 m² small squares, whose center are the measurement points of the infrared ground temperature sensor 14. The infrared ground temperature sensor 14 measures the temperature of the center points of all small squares, and gets all the small squares and their center points whose outdoor ground temperature exceeds the outdoor ground temperature threshold. The positions at these points are obtained by GPS. The optimal route from the position to the center points of these small squares that need to be cooled is calculated through ant colony algorithm.

S14 The mobile control system starts the left drive wheel 9 and the right drive wheel 10. The terminal control system opens the ground spray 8 to move the spray cooling fan and spray according to the optimal path. The ground temperature in the control area is maintained within the appropriate range to protect the ground, cool and remove the dust indirectly.

As shown in FIG. 3, this is the block diagram of the terminal control principle, which gives the initial set value of the parameters of the terminal equipment of the system. The information processing system optimization detection module is optimized according to the group thermal sensation measured by the data acquisition system and the personnel voice information received by the intelligent voice interaction system. Then the stated values of the optimized parameters of the terminal equipment are acquired. If this system need to regulate the terminal equipment, the terminal controller will control the terminal actuator to execute the commands. This makes the controlled variables of the controlled terminal equipment reach the optimal set values and the majority of people in the control area become higher thermal comfort.

What is claimed is:

1. A spray cooling fan control system based on computer vision technology, comprising: a data acquisition system, an information processing system, a mobile control system, an intelligent voice interaction system, and a terminal control system;
   wherein the data acquisition system is used to:
      collect data information, comprising: postures and positions of persons in a control area, facial skin temperatures of the persons, an initial position of a spray cooling fan, an outdoor air temperature, an outdoor air humidity, and a ground temperature;
      compare the outdoor air temperature with an outdoor air temperature threshold; and
      when the outdoor air temperature is greater than the outdoor air temperature threshold, transmit the data information to the information processing system;
   wherein the data acquisition system comprises:
      a personnel data acquisition module, comprising:
         a camera, disposed on a top of the spray cooling fan and used to acquire a digital image matrix of the postures of the persons, the positions of the persons, a density of the persons, and the facial skin temperatures of the persons; and
         an infrared temperature sensor, disposed on the top of the spray cooling fan and used to calculate the facial skin temperatures of the persons with the camera;
      an environmental data acquisition module, comprising:
         an air temperature sensor, disposed under a solar photovoltaic power panel on the top of the spray cooling fan, and used to gather the outdoor air temperature near the spray cooling fan in the control area;
         an air humidity sensor, disposed under the solar photovoltaic power panel on the top of the spray cooling fan, and used to collect the outdoor air humidity near the spray cooling fan in the control area; and
         an infrared temperature sensor, disposed under the solar photovoltaic power panel on the top of the spray cooling fan, and used to acquire the ground temperature near the spray cooling fan in the control area; and
      a position module, comprising:
         a spray cooling fan locator, disposed under the spray cooling fan, and used to collect the initial position of the spray cooling fan using a global positioning system (GPS) method; and
         an ultrasonic distance meter, disposed under the spray cooling fan, and used to: obtain distances between the persons and the spray cooling fan; and obtain positions of the persons on a map according to the distance and the positions of the persons;
   wherein the information processing system, comprising a first processor, which is used to:
      obtain the data information collected by the data acquisition system;
      optimize the data information to calculate a group thermal sensation, an optimal position of the spray cooling fan, and real-time obstacle avoidance information for movement of the spray cooling fan;
      when the group thermal sensation is greater than a group thermal sensation threshold, obtain an optimal route for the movement of the spray cooling fan according to the initial position of the spray cooling fan, the optimal position of the spray cooling fan, and the real-time obstacle avoidance information for the movement of the spray cooling fan;
      transfer the optimal route for the movement of the spray cooling fan and the real-time obstacle avoidance information for the movement of the spray cooling fan to the mobile control system; and
      transfer the group thermal sensation to the terminal control system;

wherein the mobile control system, comprising a controller, which is used to:
  control the spray cooling fan to move to the optimal position of the spray cooling fan according to the optimal route for the movement of the spray cooling fan and the real-time obstacle avoidance information for the movement of the spray cooling fan; and
  transmit location information of the mobile control system to the intelligent voice interaction system;
wherein the intelligent voice interaction system, comprising a second processor, which is used to:
  acquire the location information of the mobile control system and interrogate the persons around the spray cooling fan to turn on a spray device and/or a fan of the spray cooling fan; and
  transmit voice commands of the persons to the terminal control system; and
wherein the terminal control system, comprising a terminal controller, which is used to:
  obtain the voice commands of the persons; and
  control an opening of the spray cooling fan according to the group thermal sensation.

2. The spray cooling fan control system based on computer vision technology as claimed in claim 1, wherein the information processing system is further used to:
  modify a mathematical model between the facial skin temperatures of the persons, the outdoor air temperature, the outdoor air humidity, the ground temperature, and a thermal sensation of each of the persons to obtain a thermal sensation of each of the persons;
  integrate thermal sensations of the persons by a fuzzy integrated evaluation method to obtain the group thermal sensation;
  transmit and receive ultrasonic, to obtain distances between the spray cooling fan, the persons, and an obstacle and thereby to obtain real-time obstacle avoidance information for the movement of the spray cooling fan and position coordinates of the persons in the control area;
  set an area with a largest number of persons in the position coordinates as a target area;
  determining a location which is 0.5 m around the target area and closest to the spray cooling fan as the optimal position of the spray cooling fan;
  acquire, based on the real-time obstacle avoidance information for the movement of the spray cooling fan and the optimal position of the spray cooling fan, the optimal route for the movement of the spray cooling fan from the initial position of the spray cooling fan to the optimal position of the spray cooling fan through an ant colony algorithm.

3. The spray cooling fan control system based on computer vision technology as claimed in claim 1, wherein the terminal control system is further used to:
  in response to receiving the voice commands of the persons from the intelligent voice interaction system indicating turning on the fan and/or the spray device, and adjust the opening of the spray cooling fan according to a fan gear and an opening of a spray water flow valve corresponding to the group thermal sensation; or
  in response to receiving the voice commands of the persons from the intelligent voice interaction system indicating turning off the fan and/or the spray device, or in response to the group thermal sensation being less than the group thermal sensation threshold, control the fan and/or spray device to turn off.

4. The spray cooling fan control system based on computer vision technology as claimed in claim 1, further comprising a biological real-time machine learning system, which is embodied by at a third processor and a memory coupled to the third processor, and the memory stores computer programs executable by the third processor;
wherein the third processor is used to:
  store information, comprising: the facial skin temperatures of persons, the outdoor air temperature, the outdoor air humidity, the ground temperature, the group thermal sensation, the positions of the persons, the optimal route for the movement of the spray cooling fan and an adjusted fan gear and/or spray water volume information; and
  obtain, based on the stored information, personal preference in an active area and group thermal preference.

5. The spray cooling fan control system based on computer vision technology as claimed in claim 1, further comprising an alarm system, and the alarm system comprising a power alarm and a water alarm;
wherein the alarm system is used to:
  alarm and warn a water level of a water tank of the spray cooling fan and a remaining battery power; and
  sending alarm information to the information processing system, when the water level is less than 30% and/or the remaining battery power is less than 20%;
wherein the information processing system is used to:
  calculate, based on the initial position of the spray cooling fan, an optimal route of the spray cooling fan from the initial position to a water storage room, and transmit the optimal route of the spray cooling fan from the initial position to the water storage room to the mobile control system; and
wherein the mobile control system is used to drive the spray cooling fan to move to the water storage room.

6. The spray cooling fan control system based on computer vision technology as claimed in claim 1, further comprising a ground cooling system, wherein the ground cooling system comprises a ground spray, which is used to cool outdoor ground within the control area.

7. The spray cooling fan control system based on computer vision technology as claimed in claim 1, wherein the group thermal sensation $TSV_q$ is calculated by the following formula:

$$TSV_q = a_1 TSV_1 + a_2 TSV_2 + \ldots + a_m TSV_m$$

where $TSV_q$ represents the group thermal sensation in the control area, which is a linear function of a real-time thermal sensation of each of the persons; $a_m$ represents an m-th personal thermal sensation weigh factor, which is used to indicate a degree of influence of an m-th personal thermal sensation on the group thermal sensation, and $$\sum_1^m a_m = 1;$$

a weight of each of the persons in the control area is equal for regulating a summer outdoor thermal environment area, and $$a_1 = a_2 = \ldots = a_m = \frac{1}{m};$$

and $TSV_m$ represents a real-time thermal sensation of an m-th person of the persons; and wherein a correspondence relationship between the group thermal sensation, a fan gear, and an opening of a spray water flow valve is expressed in the following table:

| Thermal Description | Hot | Warm | Slightly warm | Normal | Slightly cool | Cool | Cold |
|---|---|---|---|---|---|---|---|
| TSVq numerical values | 3 | 2 | 1 | 0 | −1 | −2 | −3 |
| Fan gear | 3 | 2 | 1 | 0 | 0 | 0 | 0 |
| Opening of a spray water flow valve. | 100% | 60% | 30% | 0 | 0 | 0 | 0 |

8. A method for controlling a spray cooling fan based on computer vision technology, comprising the following steps:
obtaining, a map of a control area of a spray cooling fan, an outdoor air temperature, an outdoor air humidity, and a ground temperature; and comparing the outdoor air temperature with an outdoor air temperature threshold;
in response to the outdoor air temperature being greater than the outdoor air temperature threshold, acquiring a video of the control area of the spray cooling fan to determine whether there is a person active in the control area and a thermal posture of an active person; and when there is one of persons in the control area with a thermal posture, obtaining the facial skin temperature of the persons;
acquiring, based on the facial skin temperatures of the persons, the outdoor air temperature, the outdoor air humidity, and the ground temperature, a thermal sensation of each of the persons, to thereby a group thermal sensation in the control area; and comparing the group thermal sensation with a group thermal sensation threshold;
in response to the group thermal sensation being greater than the group thermal sensation threshold, acquiring two-dimensional position coordinates of the persons in the control area and a initial position of the spray cooling fan; setting an area with a largest number of persons in the position coordinates as a target area; determining a location which is 0.5 m around the target area and closest to the spray cooling fan as an optimal position of the spray cooling fan; and acquiring an optimal route for movement of the spray cooling fan from the initial position of the spray cooling fan to the optimal position of the spray cooling fan through an ant colony algorithm;
controlling the spray cooling fan to move to the optimal position of the spray cooling fan according to the optimal route for the movement of the spray cooling fan;
asking the persons in the target area whether to turn on a spray device and/or a fan of the spray cooling fan; and
in response to determining that the spray device and/or the fan of the spray cooling fan are/is required to be turned on, controlling the spray device and/or the fan of the spray cooling fan to turn on to correspond to a fan gear and an opening of a spray water flow valve corresponding to the group thermal sensation.

9. A spray cooling fan control system based on computer vision technology, comprising: a data acquisition system, an information processing system, a mobile control system, an intelligent voice interaction system, and a terminal control system;
wherein the data acquisition system is used to:
collect data information, comprising: postures and positions of persons in a control area, facial skin temperatures of the persons, an initial position of a spray cooling fan, an outdoor air temperature, an outdoor air humidity, and a ground temperature;
compare the outdoor air temperature with an outdoor air temperature threshold; and
when the outdoor air temperature is greater than the outdoor air temperature threshold, transmit the data information to the information processing system;
wherein the data acquisition system comprises:
a personnel data acquisition module, comprising:
a camera, disposed on a top of the spray cooling fan and used to acquire a digital image matrix of the postures of the persons, the positions of the persons, a density of the persons, and the facial skin temperatures of the persons; and
an infrared temperature sensor, disposed on the top of the spray cooling fan and used to calculate the facial skin temperatures of the persons with the camera;
an environmental data acquisition module, comprising:
an air temperature sensor, disposed under a solar photovoltaic power panel on the top of the spray cooling fan, and used to gather the outdoor air temperature near the spray cooling fan in the control area;
an air humidity sensor, disposed under the solar photovoltaic power panel on the top of the spray cooling fan, and used to collect the outdoor air humidity near the spray cooling fan in the control area; and
an infrared temperature sensor, disposed under the solar photovoltaic power panel on the top of the spray cooling fan, and used to acquire the ground temperature near the spray cooling fan in the control area; and
a position module, comprising:
a spray cooling fan locator, disposed under the spray cooling fan, and used to collect the initial position of the spray cooling fan using a global positioning system (GPS) method; and
an ultrasonic distance meter, disposed under the spray cooling fan, and used to: obtain distances between the persons and the spray cooling fan; and obtain positions of the persons on a map according to the distance and the positions of the persons;
wherein the information processing system, embodied by a first processor and a first memory coupled to the first processor, and the first memory stores first computer programs executable by the first processor, and the first processor is used to:
obtain the data information collected by the data acquisition system;
optimize the data information to calculate a group thermal sensation, an optimal position of the spray cooling fan, and real-time obstacle avoidance information for movement of the spray cooling fan;
when the group thermal sensation is greater than a group thermal sensation threshold, obtain an optimal route for the movement of the spray cooling fan according to the initial position of the spray cooling fan, the optimal position of the spray cooling fan, and the real-time obstacle avoidance information for the movement of the spray cooling fan;

transfer the optimal route for the movement of the spray cooling fan and the real-time obstacle avoidance information for the movement of the spray cooling fan to the mobile control system; and transfer the group thermal sensation to the terminal control system;

wherein the mobile control system, embodied by a second processor and a second memory coupled to the second processor, and the second memory stores second computer programs executable by the second processor, and the second processor is used to:

control the spray cooling fan to move to the optimal position of the spray cooling fan according to the optimal route for the movement of the spray cooling fan and the real-time obstacle avoidance information for the movement of the spray cooling fan; and transmit location information of the mobile control system to the intelligent voice interaction system;

wherein the intelligent voice interaction system, embodied by a third processor and a third memory coupled to the third processor, and the third memory stores third computer programs executable by the third processor, and the third processor is used to:

acquire the location information of the mobile control system and interrogate the persons around the spray cooling fan to turn on a spray device and/or a fan of the spray cooling fan; and transmit voice commands of the persons to the terminal control system; and wherein the terminal control system, comprising a terminal controller and used to:

obtain the voice commands of the persons; and control an opening of the spray cooling fan according to the group thermal sensation.

* * * * *